W. R. GRADY.
SURGEON'S OPERATING TABLE.
APPLICATION FILED JUNE 5, 1911.
1,018,757.
Patented Feb. 27, 1912.
9 SHEETS—SHEET 2.
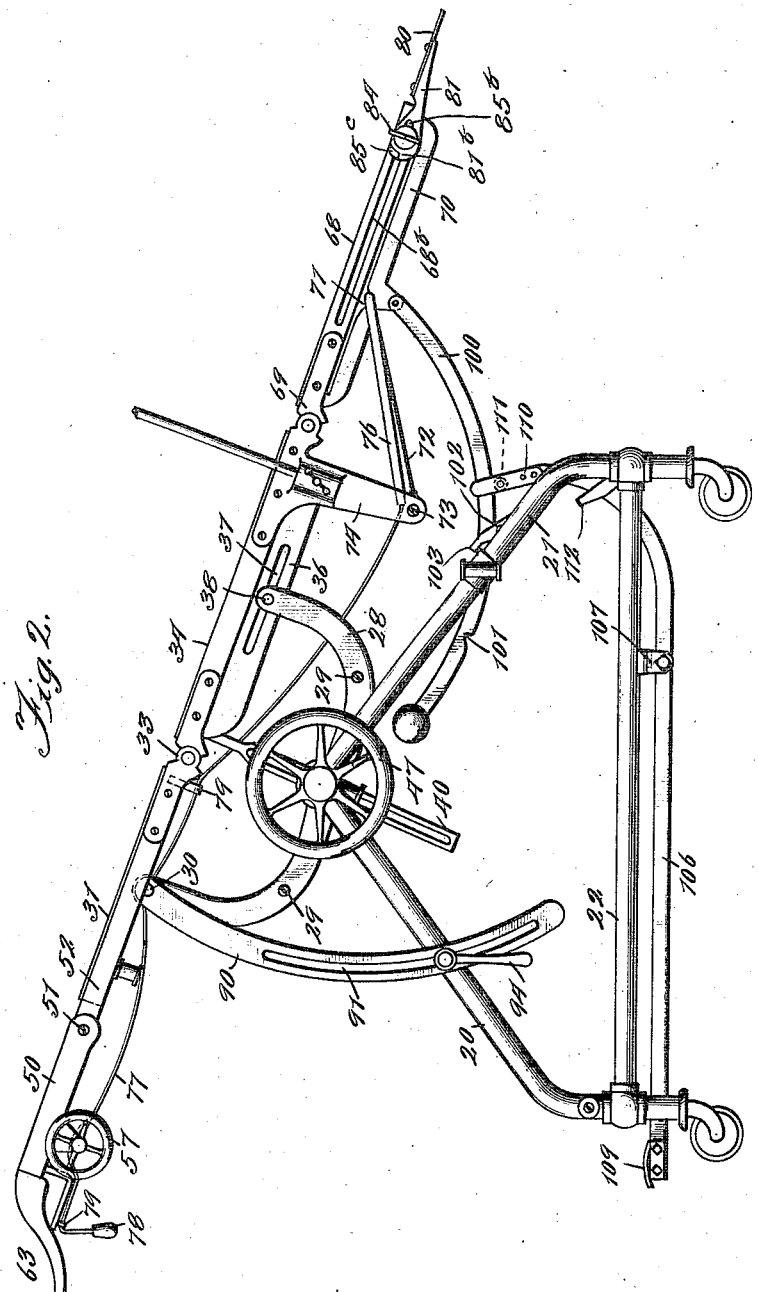

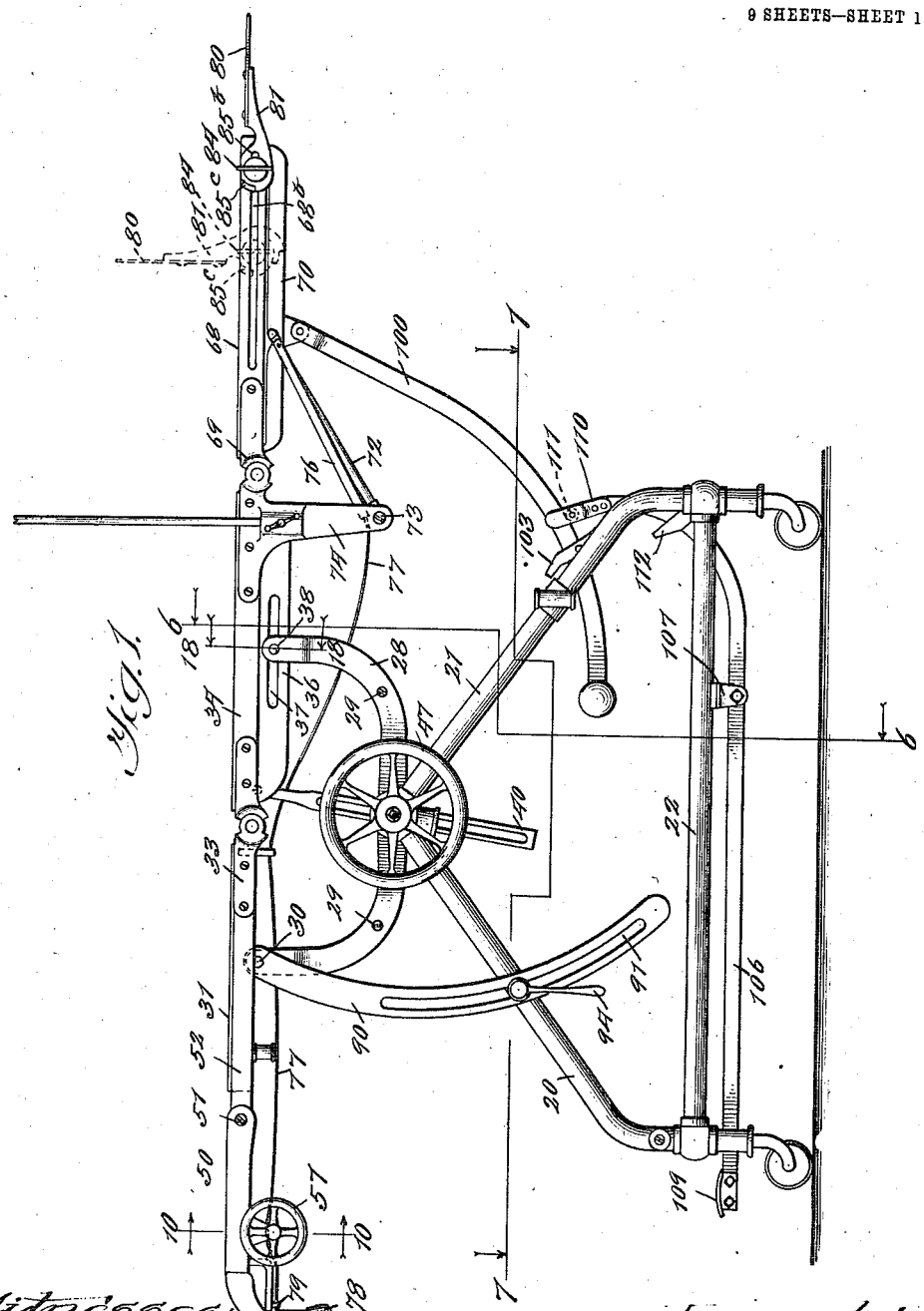

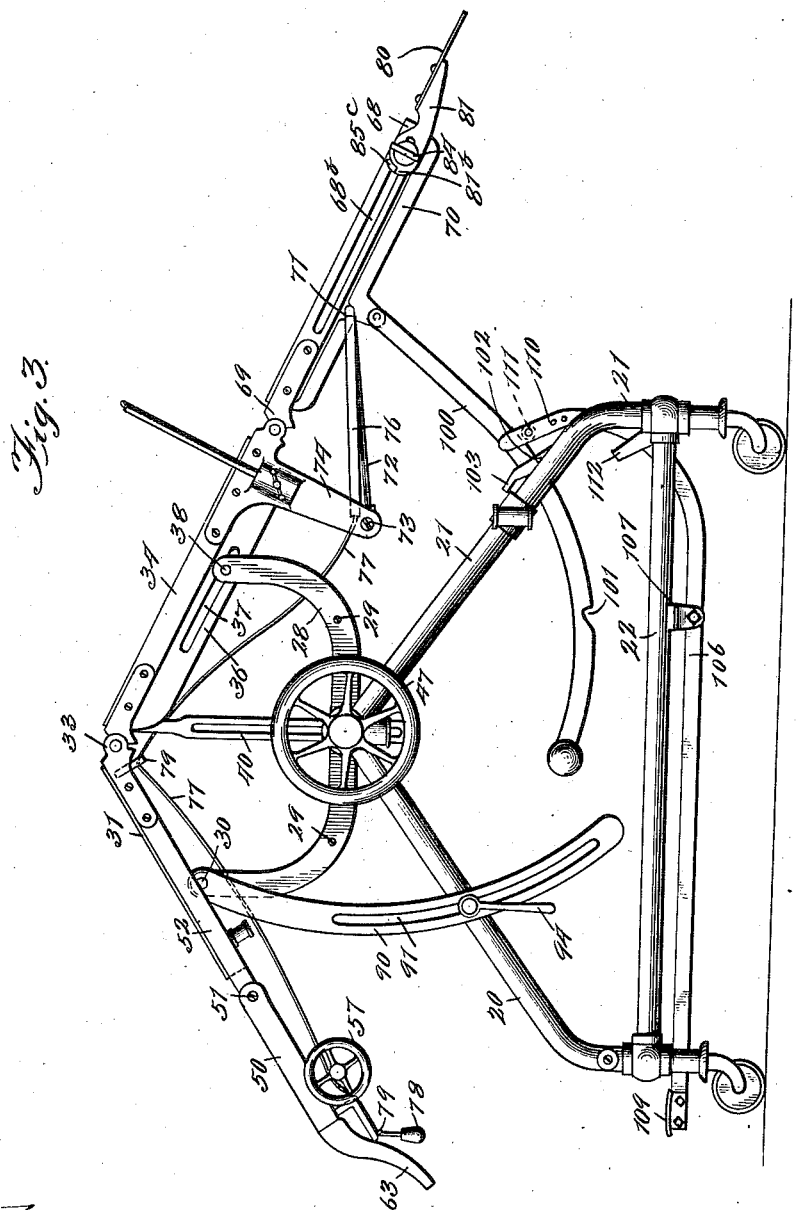

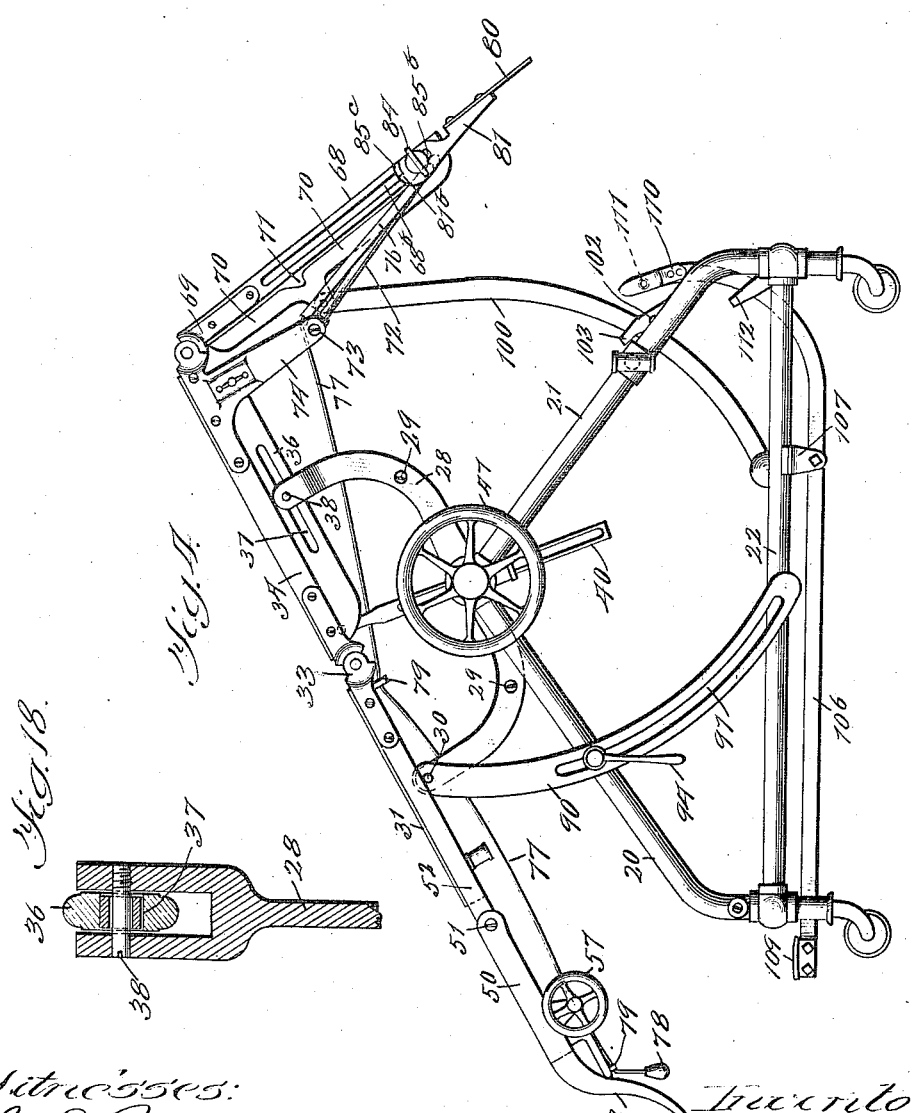

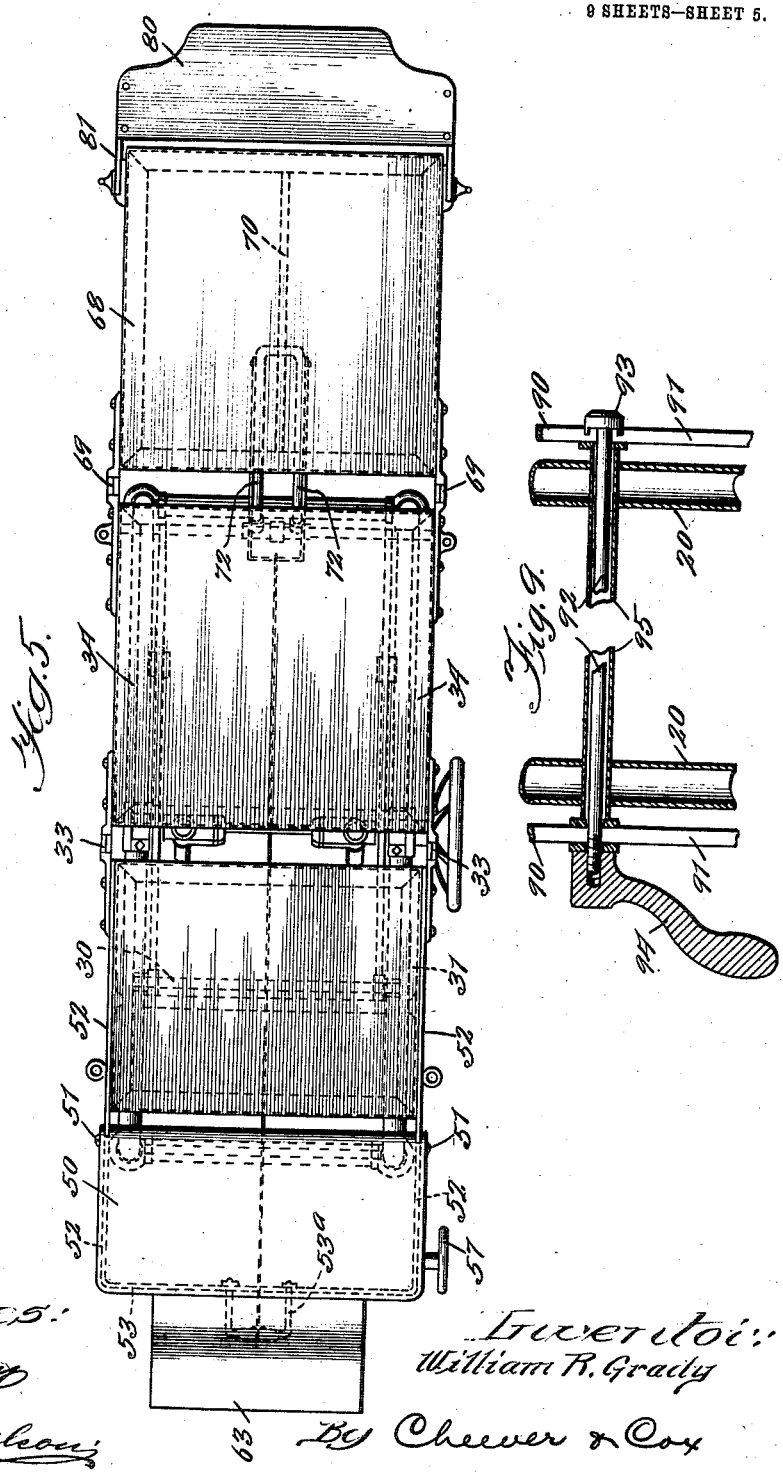

W. R. GRADY.
SURGEON'S OPERATING TABLE.
APPLICATION FILED JUNE 5, 1911.
1,018,757.
Patented Feb. 27, 1912.
9 SHEETS—SHEET 6.
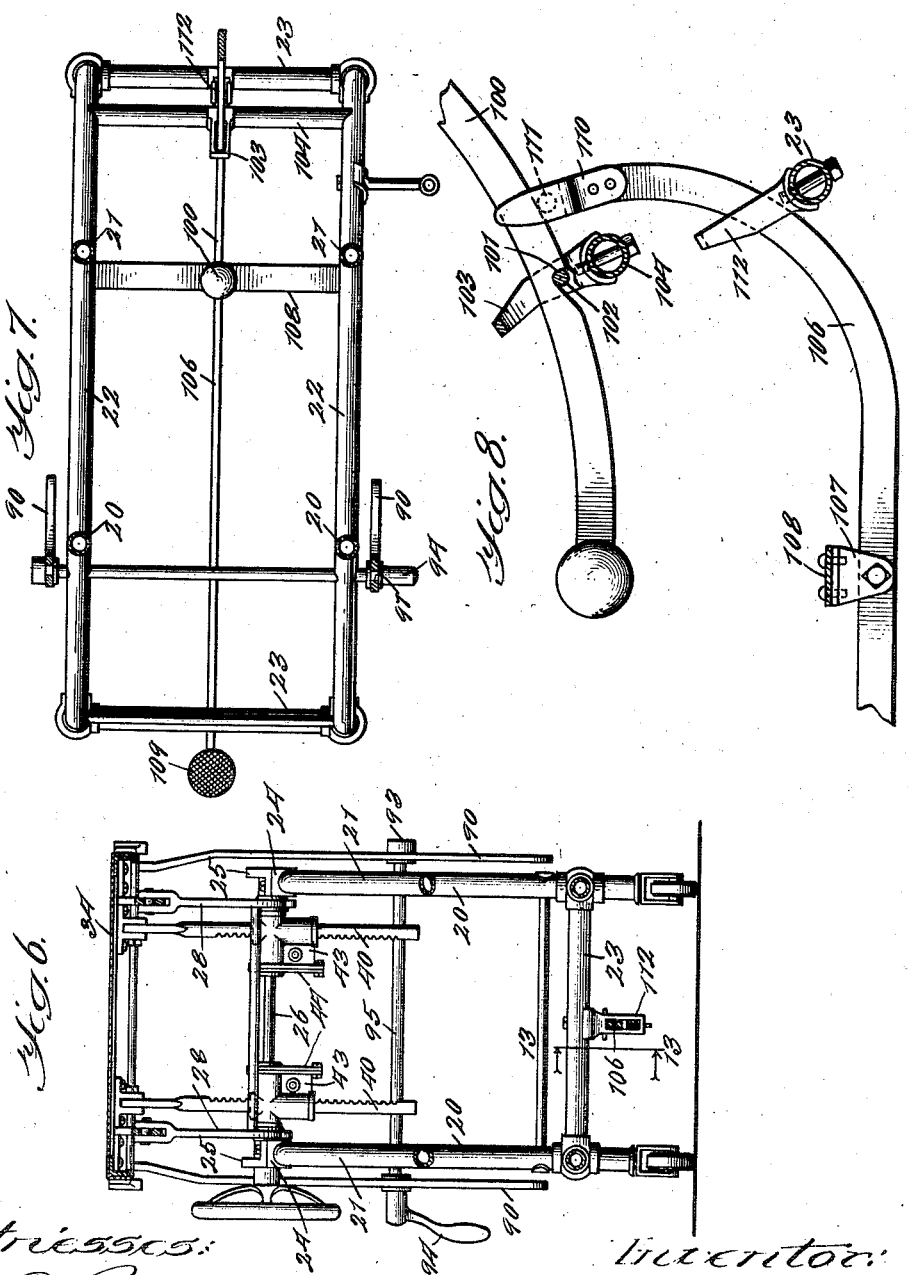

W. R. GRADY.
SURGEON'S OPERATING TABLE.
APPLICATION FILED JUNE 5, 1911.
1,018,757.
Patented Feb. 27, 1912.
9 SHEETS—SHEET 7.
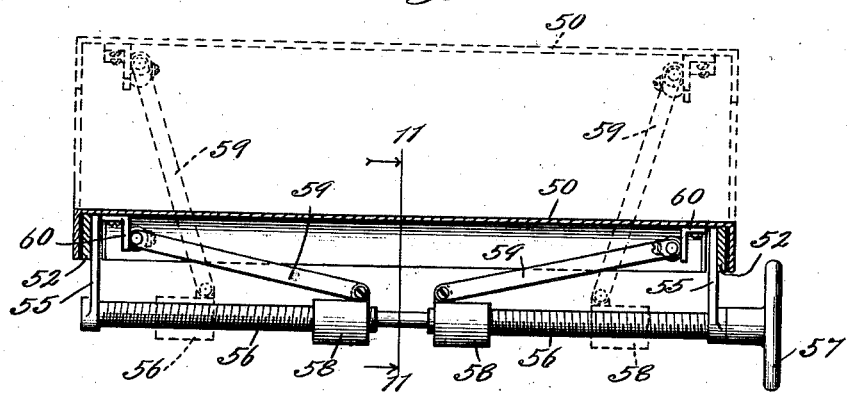
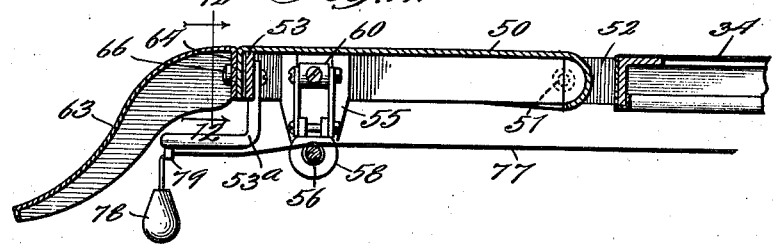
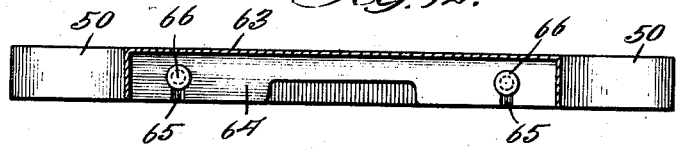
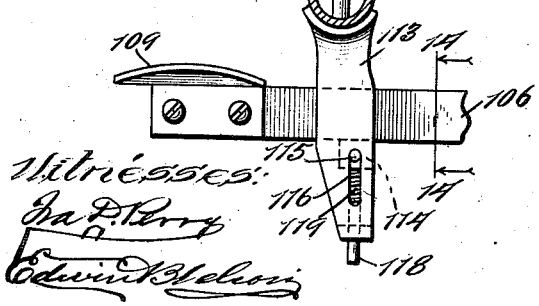
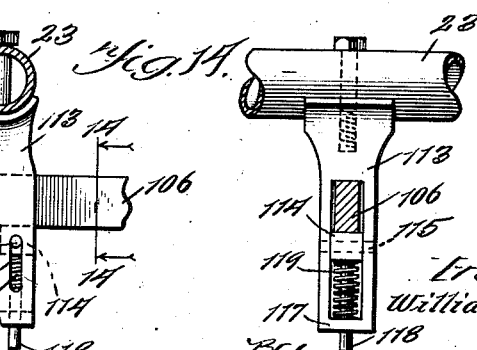
Inventor:
William R. Grady
By Cheever & Cox
Attys W. R. GRADY.
SURGEON'S OPERATING TABLE.
APPLICATION FILED JUNE 5, 1911.
1,018,757.
Patented Feb. 27, 1912.
9 SHEETS—SHEET 8.
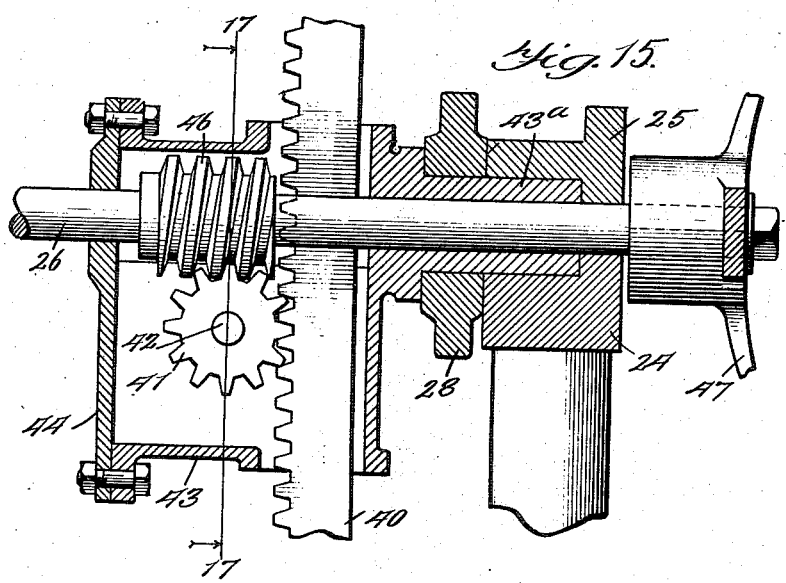
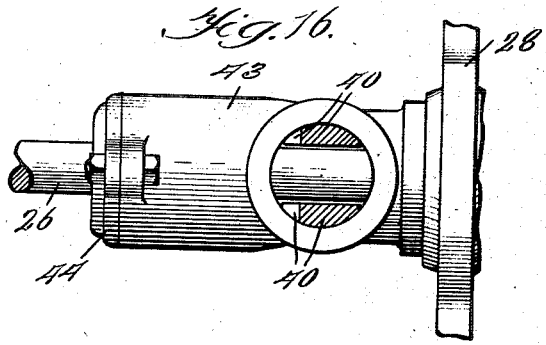
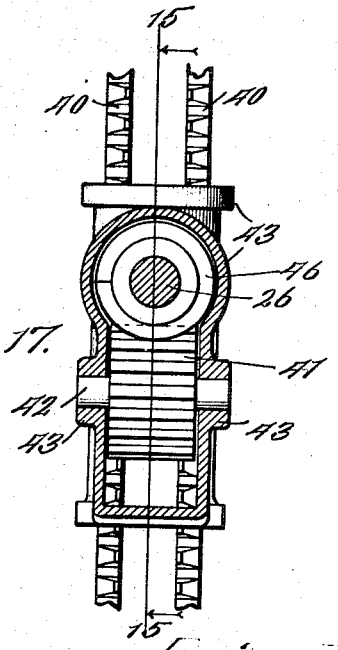
Witnesses:
Inventor:
William R. Grady
By Chever & Cox
Attys

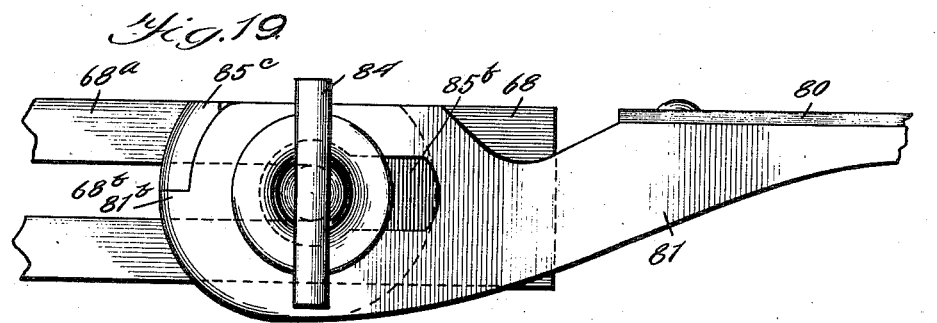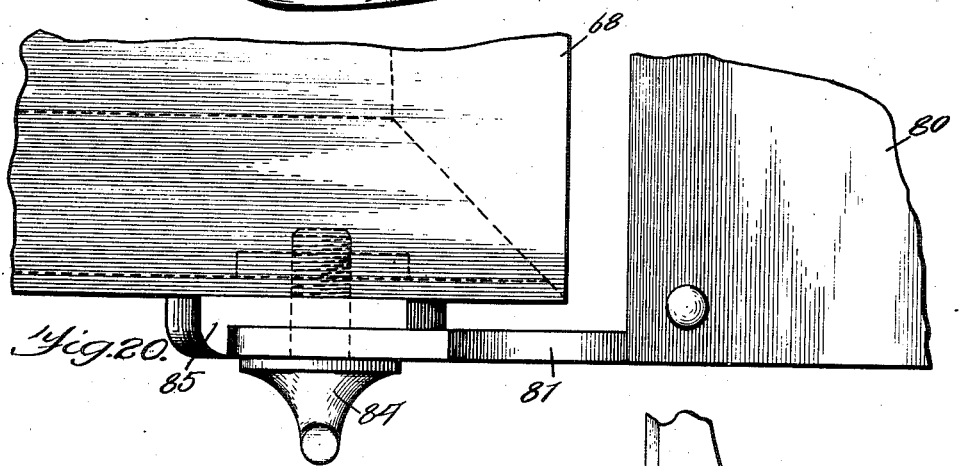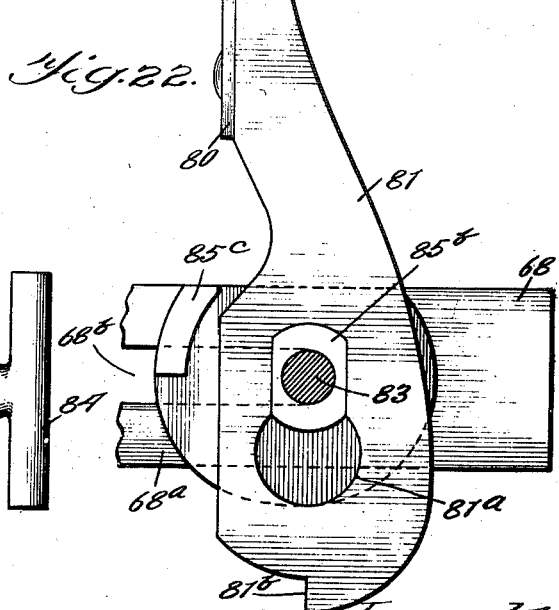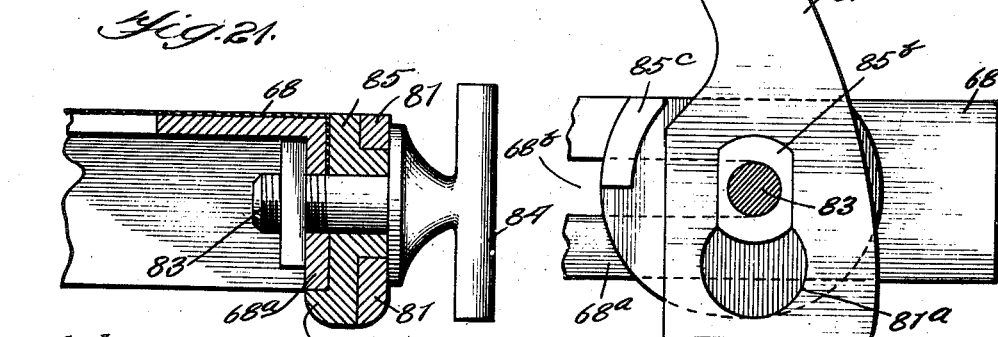

UNITED STATES PATENT OFFICE.

WILLIAM R. GRADY, OF MADISON, WISCONSIN, ASSIGNOR TO SCANLAN MORRIS CO., OF MADISON, WISCONSIN, A CORPORATION OF WISCONSIN.

SURGEON'S OPERATING-TABLE.

1,018,757.     Specification of Letters Patent.     Patented Feb. 27, 1912.

Application filed June 5, 1911. Serial No. 631,367.

*To all whom it may concern:*

Be it known that I, WILLIAM R. GRADY, a citizen of the United States, residing at Madison, in the county of Dane and State of Wisconsin, have invented a certain new and useful Improvement in Surgeons' Operating-Tables, of which the following is a specification.

My invention relates to surgeons' operating tables, and the object of my invention is to provide a table wherein every useful combination of positions of the component sections of the table may be quickly and easily obtained.

It is also my purpose to provide a construction such that the various positions may be obtained by the anesthetizer or any other person without leaving the head end of the table.

In addition, I purpose to obtain a structure in which the parts are light in weight, simple in form, positive in action, and durable.

I obtain my objects by the mechanism illustrated in the accompanying drawings, in which—

Figures 1, 2, 3 and 4 are side views of the table showing various positions thereof. Fig. 5 is a plan view of the table. Fig. 6 is a sectional elevation taken on the line 6—6, Fig. 1. Fig. 7 is a plan section taken on the line 7—7, Fig. 1. Fig. 8 is a detail view showing portions of the foot lever and ratchet bar. Fig. 9 is a sectional view of the hand nut and associated parts which serve to lock the cradle in position. Fig. 10 is a sectional view showing the mechanism for controlling the head section. The view is taken on the line 10—10, Fig. 1. Fig. 11 is a sectional view taken on the line 11—11, Fig. 10. Fig. 12 is a sectional view of the detachable head rest taken on the line 12—12, Fig. 11. Fig. 13 is a sectional detail of the parts at the operating end of the foot lever, the section being taken on the line 13—13, Fig. 6. Fig. 14 is a sectional detail taken on the line 14—14, Fig. 13. Figs. 15, 16 and 17 are detail views of the ratchet and screw mechanism for controlling the body sections. The section of Fig. 15, is indicated by the line 15—15, Fig. 17. The section of Fig. 17 is indicated by the line 17—17, Fig. 15. Fig. 18 is a fragmentary detail taken on the line 18—18, Fig. 1, showing the preferred manner of supporting the central body section upon the cradle. Figs. 19 to 22 inclusive, are detail views showing the manner in which the foot rest is mounted upon the foot section of the table.

Similar numerals denote similar parts throughout the several views.

In the preferred construction selected to illustrate the invention the main supporting frame is comprised of standards 20 and 21 on each side of the machine connected at the bottom by longitudinal braces 22 and cross braces 23. The standards on each side extend upwardly and inwardly toward each other and are joined together at the top by castings 24 which, with the caps 25, form bearings for the controlling shaft 26. Pivotally supported upon the controlling shaft is a cradle comprised of two bars 28 connected by cross braces 29. These bars are U shaped with their ends projecting upwardly and are pivoted upon said shaft near their central portion. At the head end of the cradle is secured a cross bar 30 which projects beyond the cradle and forms a supporting pivot for the upper body section 31 of the table. Said body section consists of a rectangular frame covered by nickel plated sheet copper or other suitable material. It is rectangular in outline, as shown in Fig. 5, and is intended to support the shoulders and upper portions of the body of a patient. Toward the center of the table said upper body section is connected by means of hinges 33 to the central body section 34. This is also rectangular in outline and consists of a frame covered by nickel plated sheet copper or other suitable material. Rigidly secured on the underside of said central body section are two longitudinal bars 36 having slots 37 through which extend pins 38 rigidly secured at the upper ends of the bars 28 of the cradle. This is shown in detail in Fig. 18. The central body section is thus pivotally supported upon the cradle and is free to slide longitudinally thereon to accommodate itself to the movements of the other portions of the table.

The central body section is rotated about its pivotal support by slotted rack bars 40 articulately connected to one of the body sections near the hinges 33. These bars are slotted to accommodate the controlling shaft 26 which passes through them. The teeth on said bars mesh with pinions 41, shown in detail in Figs. 15, 16 and 17. Said pinions are supported upon pins 42 journaled in gear casing 43 supported by sleeves 43ª encircling the controlling shaft 26, as shown at the right portion of Fig. 15. The casing 43 is closed by a cover 44. The pinions 41 mesh with worms 46 rigidly secured to controlling shaft 26, and the construction is such that when shaft 26 is rotated it causes the raising and lowering of the slotted rack bars and the connected ends of the table sections 31 and 34. Shaft 26 is rotated by a hand wheel 47.

The head section 50 consists of a suitable frame covered by nickel plated sheet copper or other suitable material. It is pivoted upon hinge pins 51 supported in bars 52 which are rigidly secured to the sides of the upper body section 31 and extend toward the head end of the table, as best shown in dotted lines in Fig. 5. These bars 52 are connected by a transverse bar 53 and form a rest for the head section when the same is in lowered position, as shown in Figs. 1 to 4 of the drawings. By preference the bars 52 and 53 are formed of a single piece and constitute an extension frame, extending from the upper body section 31 for supporting the head section 50.

Brackets 55 are rigidly secured to bars 52 and extend downward therefrom and form bearings for the worm shaft 56, as shown in detail in Figs. 10 and 11. Said shaft is rotated by a hand wheel 57. Two nuts 58 are located upon the worm shaft 56, and these and the worms are made "right" and "left" so that when the handle is rotated in a given direction the nuts will approach each other and when the shaft is rotated in the opposite direction the nuts will move mutually away from each other. Links 59 are articulately connected at one end to the nuts 58 and at the other end to lugs 60 fastened to the under side of the head section. The result is that when hand wheel 57 is rotated the free end of the head section will be raised or lowered. It will be noted that this mechanism is self locking in the sense that the shaft, nuts and head piece will tend to remain in any position in which they are left.

A handle 53ª, best shown in dotted lines, Fig. 5, and full lines Fig. 11, is rigidly secured to cross bar 53 and affords means whereby the operator may swing the table to different angles of inclination. It will be noted that this handle projects beyond the head end of the head section 50 and yet is rigidly connected to the upper body section 31 instead of to the adjustable and lighter and hence less massive headpiece 50. Another advantage in thus locating the handle is that it is nearer the normal position of the operator and furthermore furnishes maximum leverage with respect to the main axis of rotation-shaft 26.

A removable drop head piece 63, shown in detail in Figs. 11 and 12, is provided with a vertical flange 64 at its inner edge adapted to abut the end of the head section 50. Said flange 64 is provided with notches 65 adapted to fit over the necks of the headed pins 66 rigidly secured to the head section 50. As a result of this construction, the drop head piece may be attached by merely dropping it down into place with the pins 66 entering the slots. It may be made in any desirable shape, but in the form shown it curves downward and outward so as to throw the head of the patient back to facilitate operation upon the head, neck and thorax.

The foot section 68 consists of a rectangular frame covered by nickeled sheet copper or other material, and is articulately connected to the central body section 34 by the hinges 69. A slotted bar 70 is rigidly secured in a central position under said foot section, and has a notch 71 adapted to receive and engage the bar 72, which, according to the present design, is yoke shaped, as shown in dotted lines in plan in Fig. 5. At the lower end bar 72 is pivotally supported on a cross bar 73 carried at the lower end of brackets 74 rigidly secured to the central body section 34. The result is that when bar 72 rests in notch 71, as shown in Figs. 1, 2 and 3, the foot section will be held in alinement with the central body section, but when the upper end of said bar is raised from the notch, the foot section will descend, as shown in Fig. 4, and the cross piece at the end of said yoke bar will slide outward in the slot of bar 70. Bar 72 is thus raised clear of notch 71 by a stirrup 76 which is articulately connected to the outer end of bar 72 and is operated by a cord 77 terminating with a handle 78 at the head end of the table. Said cord is supported in suitable eyes 79.

The foot rest 80 has two arms 81 rigidly secured thereto, which are supported from the lower edge of the foot section 68 in the manner shown in detail in Figs. 19 to 22. The vertical flange of the frame piece 68ª of the foot section 68 has a slot 68ᵇ, and through this slot extends a screw 83 provided with a handle 84. A block 85 is slidingly but nonrotatively mounted upon the frame piece 68ª, being provided with a lip 85ª and being apertured to receive the hand screw 83. Integral with the block 85 is a boss 85ᵇ, which has parallel vertical sides. The arms 81 of the foot rest are each provided with a slot 81ª having parallel sides adapted to engage the parallel sides of the boss 85ᵇ and hold the foot rest upright, as shown in dotted lines, Fig. 1 and in full lines, Fig. 22. Slot 81ª is enlarged at one portion as shown in Fig. 22, and by raising the foot rest and bringing the boss 85ᵇ into the enlarged portion of the slot, the foot rest may be rotated to the horizontal where it is retained by a lip 81ᵇ engaging a lug 85ᶜ on block 85. This position is illustrated in full lines in Figs. 1 to 4 and in Fig. 19. Thus the foot rest may be quickly brought to either raised or lowered position where it will be held without waiting to tighten the screws 83. As the block 85 is slidable longitudinally on the foot section 68, the foot rest may be adjusted to accommodate persons of different heights, and as soon as the proper position has been obtained, the foot rest may be set by tightening up the hand screws 83.

From the foregoing description it will be apparent that unless the hand wheel 57 is rotated, the upper body section 31, head section 50 and head rest 63 will move as a single piece. It will also be apparent that when the yoke bar 72 is in acting position, as shown in Figs. 1 to 3, the central body section 34, foot section 68, and foot rest 80 will move as a single piece. It will also be apparent that the movement of the upper body section 31 about its fulcrum 30, and the movement of the central body section 34 about its fulcrum 38 will be controlled by the slotted rack bars 40 operated by the hand wheel 47. On account of the presence of the worms and gears which control the slotted bars 40 the upper body section 31 and central body section 34 will remain locked relatively to each other unless sufficient power be applied to the hand wheel 47 to rotate it. Consequently unless said hand wheel is positively rotated the body sections 31 and 34 will remain rigidly set with reference to each other and the whole table top will be supported upon the cradle which is pivotally supported upon the controlling shaft 26. This is illustrated by comparing Figs. 1 and 2. It will be seen in Fig. 1 that all the sections of the table top are in alinement with each other and are in horizontal position. In Fig. 2 all the table top sections remain in alinement with each other but are, together with the cradle, rotated as a unit about the shaft 26 as a pivot. This pivotal or rocking movement of the cradle is prevented and the cradle is held in any desired position by a slotted bar 90 which is articulately connected at one end to the cross bar 30 and is provided at the other end with a slot 91 which receives a rod 92 having a head 93 at one end and a hand nut 94 at the other. A spacing tube 95 surrounds said rod and extends between the said bars 90 to form a spacer. The rod and spacer pass through the standards 20 and are thus held stationary. This construction is shown in detail in Fig. 9. The arrangement is such that when the hand screw is backed off, the cradle may be swung about its pivot 26, but when said screw is tightened, it will hold the cradle rigidly set in any desired position. When the dog 72 is in engagement with the slotted bar 70 at the notch 71 therein, the foot section 68 and central body section 34 will rotate as a single piece. In my table, however, I have provided means whereby the operator, without leaving his position at the head of the table, may very quickly obtain the position known as the "Trendelenberg position," shown in Fig. 4. The mechanism for releasing the yoke bar 72, and thus permitting the movement of the foot section 68 relatively to the central body section 34 has already been described. I will now describe the remaining portions of the mechanism for obtaining the "Trendelenberg position".

Pivotally connected to the slotted bar 70, above mentioned, is a ratchet bar 100. This is preferably weighted at the end and curved, as shown in the drawings. On its lower edge it has a notch 101 adapted to engage a pin 102 carried transversely in a guide or keeper 103 rigidly secured to the cross brace 104, as shown in detail in Figs. 7 and 8. The weight of the table is distributed in such manner that when the hand nut 94 is loose, the foot portions of the table tend to descend, and if the yoke bar 72 is engaged within the notch 71 in the bar 70, and the ratchet bar 100 is disengaged from the pin 92, the tendency is for the table to swing from the position shown in Fig. 1 toward the position shown in Fig. 2. By swinging the table from the position shown in Fig. 2 to the position shown in Fig. 1, the bar 100 will slide along upon the pin 102 until the latter enters the notch 101, whereupon the bar 100 will support the table without the assistance of the slotted bars 90.

The ratchet bar 100 may be released from the pin 102 by the foot lever 106, which is fulcrumed upon a bracket 107 fastened to a cross brace 108 carried by the frame members 22, as shown in detail in Figs. 7 and 8. Said foot lever extends to the head of the table where it is provided with a pedal 109, where it may be conveniently reached by the foot of the operator standing at the head end of the table. A forked or "Y" shaped piece 110 is fastened to the other end of said foot lever and carries a roller 111 adapted to engage the lower edge of bar 100 and raises it from the pin 102. The roller permits the bar to rest thereon and travel with minimum friction. The foot lever is guided by a guide or keeper 112 rigidly secured to one of the cross braces 23, as best shown in Figs. 6, 7 and 8.

In order to normally hold the foot lever clear of the ratchet bar 100, spring mechanism is provided, which is shown in detail in Figs. 13 and 14. A guide 113 is rigidly secured to one of the cross braces 23 and is vertically slotted to permit vertical movement of the foot lever. A block 114 slides vertically within said guide 113 beneath the foot lever and is provided with laterally extending guide pins 115 which project into slots 116 in the sides of said guide. Said guide has a cross piece or platform 117 at its lower end, which is apertured to receive a guide rod 118 extending down from said block. A compression spring 119 rests upon the platform 117 and normally holds block 114 in raised position. The arrangement of the parts is such that the pedal end of the foot lever will be normally held in raised position and the forked piece 110 will be held clear of the ratchet bar 100, but when the pedal is depressed, the roller 111 will lift the ratchet bar from the pin 102 and permit said bar to descend.

Operation: As a result of the construction explained in the foregoing description, the operator can obtain a great variety of positions, and the most important ones of these can be obtained by him without leaving his position at the head of the table. Ordinarily the operator who manipulates the table will be the one who gives the anesthetic, and is, therefore, necessarily stationed at the head of the table, and should not have to leave his position. I have already described how the foot piece 80 may be adjusted, and how the head section 50 may be raised and lowered with reference to the rest of the table. I have also described how the removable drop head 63 may be attached and detached. I will now describe how some of the main positions of the table may be obtained, although it will be understood that the variety of positions is almost infinite and will afford every known position which the surgeon may desire. When the ratchet bar 100 is in engagement with the stationary pin 102, it is adequate to hold the table in the horizontal position shown in Fig. 1, provided the yoke bar 72 is within the notch 71. If additional security of position is wanted, the hand nut 94 may be tightened.

Let it be assumed that the operator wishes to throw the table from the horizontal position shown in Fig. 1 to the position known as the "Trendelenberg position" shown in Fig. 4. He first loosens the hand nut 94, so that the cradle 28, 29 may be free to rock about its pivot shaft 26. He then pulls the handle 78 of the cord or chain 77, thereby raising the yoke bar 72 out of the notch 71 in the slotted bar 70. This permits the parts of the hinge 69 to articulate or flex. Under these conditions the ratchet bar 100, supported as it is upon the stationary pin 102, acts as a fulcrum or pivotal support for the foot section 68. The operator thereupon lowers the head portion of the table, thereby causing the cradle to rock about its fulcrum 26 and the foot section 68 to rock about its prop or support 100, as upon a swinging fulcrum. It will be noted that this action is all accomplished without requiring the operator to leave the head end of the table. The table is readily set in this "Trendelenberg position" by tightening up the hand nut 94. It will be seen that with my construction, the position of the foot section 68 is obtained automatically, it being unnecessary for the operator to do anything but depress the table head after the yoke bar 72 has been released.

In order to bring the body of the table back to the horizontal position from the "Trendelenberg position," the table is simply raised at the head, the yoke bar automatically entering the notch in the slotted bar 70 as the table reaches horizontal position. If desired, the table may be locked in this position by tightening up the hand nut 94, but this is not essential, for in the proportions here shown the weight of the table will hold the foot portions down, resting upon bar 100.

In operations in the pelvic cavity where pus is apt to be found, it is absolutely necessary at times to secure immediate drainage from the upper portion of the cavity to the lower portion thereof. It, therefore, becomes necessary at times to reverse the table from the "Trendelenberg position" to what is termed the "reverse Trendelenberg position," as shown in Fig. 2. This change must be made very quickly, and is accomplished by elevating the head of the table which first brings the parts in horizontal position, and causes the yoke bar to automatically enter the slot 71 in bar 70. This holds the foot section 68 in alinement with the central body section 34. As soon as the yoke bar has thus entered the notch, the operator depresses the pedal 109, thus releasing the ratchet bar 100 and permitting the parts to swing to the angle desired. The table may then be set by tightening the hand nut 94. By actual test, a skilful operator may make this change from "Trendelenberg position" to "reverse Trendelenberg position" in from two to three seconds. When the "reverse Trendelenberg position" is apt to be required, the operator will previously set the foot rest 80 in upright position, as shown in dotted lines in Fig. 1.

In case the operator wishes to tilt the table to an angle in which the head portion is lower than the foot portion and the sections are all in alinement, it is merely necessary to loosen the hand nut 94 and depress the head of the table to the extent desired.

In operations of the stomach, gall bladder or kidneys, it is usually necessary to elevate these organs from the cavity in which they lie. This may be accomplished by breaking the upper body section of table 31 and central section 34, at point marked 33, as shown in Fig. 3. To do this, if the table is in the horizontal position, as shown in Fig. 1, the operator first loosens hand-nut 94 and presses down upon foot lever 109 so that slot in ratchet bar 100 is raised from pin 102 and bar 100 allowed to pass over pin 102 about one inch; then hand-nut 94 is tightened. He then rotates hand-wheel 47 in such directions as to raise slotted ratchet bars 40. This permits section 34 and foot section 68 of the table to descend in the angle required in the same plane.

If the operator wishes to lower the central portion of the table, he may do so by rotating the hand wheel 47 in a direction to lower the rack bars 40.

By referring to Fig. 3 it will be seen that when the cradle is held fast and the ratchet bar 100 is released, the raising and lowering of the slotted rack bars 40 will cause the rotation of the upper and central body sections 31 and 34 about their pivots 30 and 38 respectively. Thus it may be said that the sections 31 and 34 are both pivotally supported and pivotally connected together.

Of course, various combinations of these positions may be obtained, for it will be noted that in addition to the drop head 63 and foot rest 80 there are four different main sections of the table, which are pivotally connected together and which are adjustable with reference to each other and to the horizon; but the foregoing illustrations are believed to be sufficient to enable the operator to manipulate the table and obtain any combination of positions desired.

Having thus described my invention what I claim as new, and desire to secure by Letters Patent, is:—

1. In an operating table, two pivotally connected table top sections, a supporting cradle consisting of two parallel U shaped bars, located at a distance apart less than the width of said sections, one section being articulately supported on one end of the cradle and the other upon the other end of the cradle, the point of connection between the sections being between the ends of the cradle, a shaft whereon said cradle is pivotally supported, and means mounted on said shaft for bringing said sections to a concave and to a convex angle with reference to each other.

2. In an operating table, two pivotally connected table top sections, a cradle consisting of two parallel U shaped bars, said sections being articulately supported on said cradle at points on opposite sides of the point of connection between the sections, a shaft for pivotally supporting said cradle, a bar connected to said sections between the points of support thereof, means supported by said shaft for raising and lowering said bar for moving said sections to a concave and to a convex angle with respect to each other, and means for securing said cradle at different angles of inclination.

3. In an operating table the combination of a rocking cradle, a controlling shaft whereon said cradle is adapted to rock, table top sections one of which is pivotally supported upon said cradle, a slotted rack bar pivotally connected to the pivotally supported table top section, said controlling shaft passing through the slot in said rack bar, a pinion adapted to mesh with said rack bar, said pinion having a stationary axis of rotation, and a worm secured to said shaft and adapted to rotate said pinion to thereby raise and lower said rack bar.

4. In an operating table the combination of a first table top section, means comprising a main frame for supporting said section, a second table top section hinged to said first section, a retractable prop for holding said second section rigid with respect to the first section, and a releasable member connected at one end to said second section and adapted to engage said main frame for supporting said second section when said prop is retracted.

5. In an operating table the combination of a main supporting frame, a table top section pivotally supported upon said main frame, a second table top section, hinged to the first section, manually releasable holding means for holding the second section rigid with respect to the first section, and a supporting bar 100 connected at one end to said second section and adapted to be connected also to said main frame for supporting said second section when said releasable holding means is released.

6. In an operating table the combination of a main supporting frame, a rocking member adapted to rock thereon, a table top section pivotally supported upon said rocking member, means for rotating said top section about its supporting pivot, a second table top section hinged to the first, and a supporting member articulately connected to the second table top section, said supporting member being adapted to be articulately and detachably connected to said main supporting frame.

7. In an operating table the combination of a main supporting frame, a rocking member adapted to rock thereon, a pivot carried by said rocking member, a table top section pivotally and slidingly mounted upon said pivot, means for rotating said top section about its supporting pivot irrespective of the position of the rocking member, a second table top section hinged to the first, and means for holding said second section rigid with respect to the first top section.

8. In an operating table the combination of a main supporting frame, a plurality of table top sections adapted to rock as a unit upon said frame, means for setting said top sections at the different angles to which they may be rocked, a foot section hinged to one of said table top sections, and means for automatically controlling the position of said foot section when the first mentioned table top sections are rocked.

9. In an operating table the combination of a supporting frame, a table top section rotatably supported thereon, a second table top section hinged to the first, and two independent releasable holding means, one for holding the second section rigid with respect to the first and the other for varying the position of said second section with respect to the first when said first section is rotated.

10. In an operating table the combination of a supporting frame, a cradle adapted to rock thereon, a table top section supported upon said cradle and adapted to rock in unison therewith, a second table top section hinged to the first, and two independent releasable holding means, one for holding the second section rigid with respect to the first, and the other for varying the position of said second section with respect to the first section when said first section and cradle are rocked about the supporting axis of said cradle.

11. In an operating table the combination of a supporting frame, a cradle adapted to rock on said frame, a table top section pivotally supported upon said cradle, means for setting said top section with respect to said cradle irrespective of the position of the latter, a second table top section hinged to the first, releasable means for holding said second section fixed with reference to the first section whereby the two may rotate in unison, and other releasable means for varying the position of said second section with reference to the first when said first section is rotated in unison with said cradle.

12. In an operating table the combination of a main supporting frame, a controlling shaft journaled therein, a cradle pivotally supported upon said shaft and extending approximately equal distances in opposite directions therefrom, means for adjusting the position of said cradle upon said shaft, two table top sections hinged together at a point approximately midway between the ends of the cradle, said top sections being pivotally supported upon said cradle, and means operated by said shaft for raising and lowering the proximate hinged portions of said top sections.

In witness whereof, I have hereunto subscribed my name in the presence of two witnesses.

WILLIAM R. GRADY.

Witnesses:
ARTHUR M. PARDEE,
JULIA R. GRADY.